United States Patent [19]

Ekman

[11] Patent Number: 4,665,805
[45] Date of Patent: * May 19, 1987

[54] APPARATUS FOR COUNTERFLOW AIR TO AIR REGENERATIVE HEAT EXCHANGE AND VENTILATING ROOM SPACE

[75] Inventor: Heinz Ekman, Kirkkonummi, Finland

[73] Assignee: Verdal Maskinverksted A/S, Norway

[*] Notice: The portion of the term of this patent subsequent to Jan. 15, 2001 has been disclaimed.

[21] Appl. No.: 691,560

[22] Filed: Jan. 15, 1985

Related U.S. Application Data

[63] Continuation-in-part of Ser. No. 478,536, Mar. 24, 1983, abandoned.

[30] Foreign Application Priority Data

Mar. 26, 1982 [FI] Finland ............................... 821066

[51] Int. Cl.$^4$ ............................................. F24F 13/00
[52] U.S. Cl. ........................................ 98/331; 165/76; 165/54; 432/179
[58] Field of Search ................... 165/4, 10, 54, 76; 110/254; 432/180, 179, 181, 223; 98/33.1

[56] References Cited

U.S. PATENT DOCUMENTS 1,360,457  11/1920  Sklovsky ............................. 432/179
3,499,484   3/1970  Lanzoni ............................... 165/76
3,561,524   2/1971  Satterthwaite ...................... 165/76
3,635,283   1/1972  Satchwell ............................ 165/76
3,986,549  10/1976  Huggins et al. ..................... 165/76
4,049,404   9/1977  Johnson .............................. 165/54
4,102,632   7/1978  Hastings ............................ 432/179
4,107,513   8/1978  Ashford .............................. 165/76
4,130,160  12/1978  Dziedzic et al. .................... 432/223
4,347,892   9/1982  Clyne et al. ........................ 165/76
4,493,366   1/1985  Ekman ............................... 176/429

Primary Examiner—Henry C. Yuen

[57] ABSTRACT

Apparatus for recovering heat or cooling from a room space and ventilating it, consisting of heat accumulators in which the outgoing air releases its heat and from which the incoming air picks up heat or vice versa and which are alternatively connected by one end with the exhaust duct and intake duct of the room space, the direction of flow in these ducts being the same all the time under control by two flaps, and the opposite ends of the heat accumulators being connected to the fresh air intake duct and the outgoing exhaust duct, the direction of flow being the same in these latter ducts all the time under control by the two flaps. The heat accumulators consist of elements which may be added or taken off two and two, in accordance with the required capacity of the apparatus, and that the intake and exhaust ducts carried to the room spaces can correspondingly in a manner known in itself be lengthened or shortened by means of branch pieces.

2 Claims, 3 Drawing Figures

APPARATUS FOR COUNTERFLOW AIR TO AIR REGENERATIVE HEAT EXCHANGE AND VENTILATING A ROOM SPACE

CROSS-REFERENCE TO RELATED APPLICATION

This application is a continuation-in-part of Ser. No. 478,536, filed Mar. 24, 1983, now abandoned.

BACKGROUND OF THE INVENTION

The present invention concerns an apparatus for the recovery of heat or cooling from an indoor space and for its ventilation, consisting of heat accumulators in which the outgoing air releases its heat and the incoming air takes up the corresponding amount of heat, or vice versa, each accumulator being by one end alternatively connected with the exhaust and supply ducts of the room space, in which ducts the direction of flow is always the same under control by two flaps, whereas the opposite ends of the heat accumulators being correspondingly connected with the fresh air intake duct and the outgoing exhaust duct, in which latter ducts the direction of flow is also always the same under control by the same two flaps. An apparatus of this type for recovering heat from a room space and ventilating it, known in prior art, has been presented e.g. in U.S. patent application Ser. No. 438,463, now U.S. Pat. No. 4,493,366. This is intended in the first place e.g. for detached one-family houses, factory premises or hospitals. Therefore the size of the apparatus has to be dimensioned consistent with the desired effectiveness and air quantity requirements.

SUMMARY OF THE INVENTION

The object of the invention is to provide a new type of apparatus which need not be separately dimensioned for each indoor space of different volume. The apparatus of the invention is characterized in that the heat accumulators consist of elements which are added or taken away two and two in accordance with the required effectiveness and/or capacity of the apparatus, also being characterized by causing no detrimental effect on pressure drop within the apparatus even by extensive build-up to meet increasing efficiency requirements, and that the intake and exhaust ducts carried to the room spaces are correspondingly, in a manner known in itself, lengthable and shortenable, e.g. by the use of branch pieces, or by other conventional means. By the aid of the invention it becomes possible to manufacture standard-sized components, and the heat accumulator elements are subsequently added or subtracted in accordance with the effectiveness and/or capacity as required. In a multi-storey building for instance, the apparatus may be accommodated in any available space inside or outside, e.g. in the attic or on top of the roof, whence the intake and exhaust ducts have been conducted to the room spaces of the building. If further space requiring extra ventilation is added to the building, all that is necessary is to add to the apparatus the corresponding requisite additional elements.

An advantageous embodiment of the invention is characterized in that each heat accumulator unit is integrated in a U-shaped element connectable by simple connections after another element. Elements of this kind are easy and advantageous to manufacture, and may functionally even be assembled from ordinary standard rectangular duct or tube fittings, only provided with very few and simple adjustments. The invention is described in the following with the aid of an example with reference made to the attached drawings, presenting an apparatus according to the invention.

DESCRIPTION OF THE PREFERRED EMBODIMENT

Figure 1:
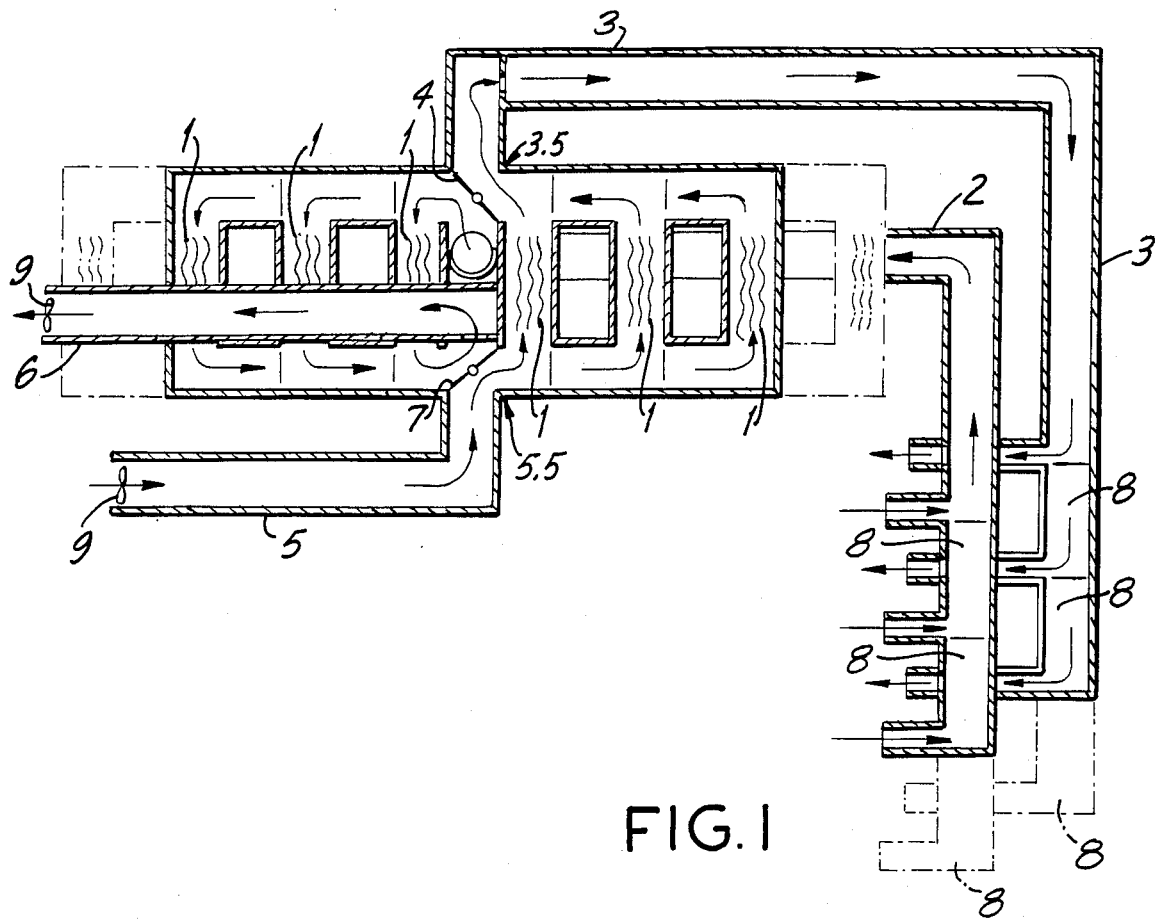
FIG. 1 is a schematic arrangement of the heat accumulator units and ducts connected thereto.
Figure 2:
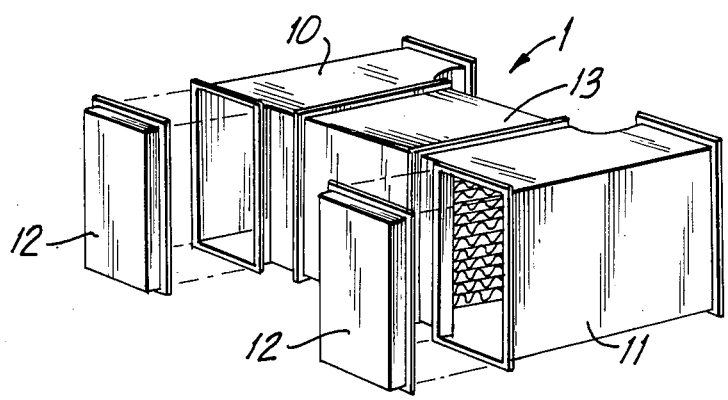
FIG. 2 is a perspective view of a heat accumulator unit.
Figure 3:
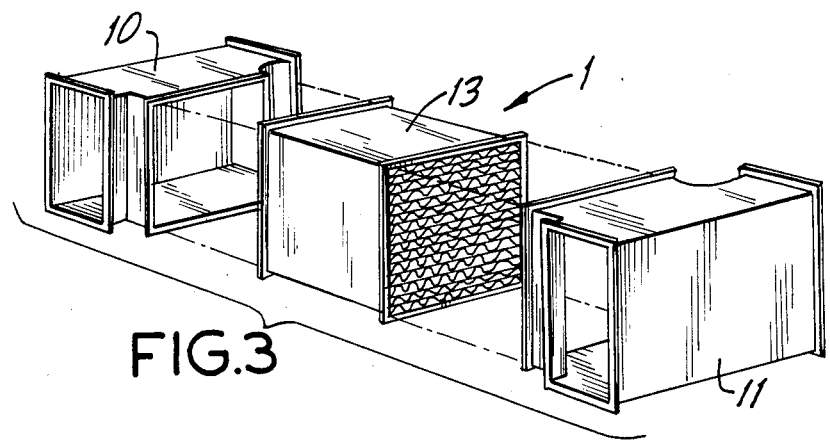
FIG. 3 is an exploded prespective view of the heat accumulator unit.

The apparatus consists of an even number of heat accumulator units 1 in which the outgoing air releases its heat and where the incoming air takes up heat, or vice versa. The heat accumulator units 1 are connected by one end to the exhaust duct 2 and supply duct 3 of the room space at one end 3.5, the direction of flow in these ducts being the same all the time under controlled coordinated action of flaps 4 and 7 which separate the accumulator units into two equal chambers. The opposite ends of the heat accumlator units 1 have been connected to the fresh air intake at an opposite end 5.5 and to the outgoing exhaust duct 6, in which ducts the direction of flow is also constantly the same under said controlled action of flaps 4 and 7. Each heat accumulator unit 1 is by preference integrated in a composite U-shaped element consisting of three parts 13, 10 and 11, the end elements of the apparatus being equipped with end lids 12. These elements are added or taken away two at a time in accordance with the capacity and/or effectiveness which the apparatus is required to have. The exhaust and supply ducts 2,3 carried to the room spaces are such that they can be correspondingly lengthened or shortened in a manner known in itself in the art e.g. with the aid of branch pieces 8, or by other conventional means. Although not shown, it is understood that the heat accumulator units as well as the branch pieces can be connected with each other in many ways known to those skilled in the art such as for example with the use of flanges and/or connecting screws.

The apparatus can be simply assembled of standard-sized pieces, and if it becomes necessary at a later time to increase the capacity and/or efficiency of the apparatus, this is easily accomplished by adding to the apparatus the requisite number of heat accumulator elements. The apparatus always operates with two blowers, one for exhaust and the other for supply air. When use of the special purging function is required for the complete removal by displacement of any remnants of exhaust air contained within the apparatus when reversing cycles, or if found necessary to render impossible any leakage of exhaust air to fresh air during cycles one of the blowers(9) is placed in the intake duct (5) and the other in the outgoing exhaust duct (6). The flaps may be controlled as has been disclosed in the U.S. patent application Ser. No. 438,463, now U.S. Pat. No. 4,493,366.

It is obvious to a person skilled in the art that different embodiments of the invention may vary within the scope of the claims following below.

I claim:

1. Apparatus for the counterflow air to air regenerative heat exchange in connection with the ventilation of a room space, comprising an even number of heat accumulator units adapted to be separated into first and second equal fluidly connected accumulator chambers in which outgoing air from said room space releases its heat and where incoming air takes up heat, or vice versa, alternatively in one or the other of the chambers, a room air exhaust duct and a room air supply duct, each of said first and second chambers being connected at one end thereof with said exhaust and intake ducts, a first valve means positioned at the connection of said chambers to said exhaust and supply ducts and at the connection of the one ends of said first set of chambers to the one ends of the second set of chambers for alternately conducting air flow from said room air exchange duct into said first set of chambers and said second set of chambers and alternately conducting air flow from said first set of chambers and said second set of chambers into said air supply duct with the direction of flow of air in said both ducts being always the same under control by said first valve means, a fresh air intake duct and an outgoing exhaust duct, said accumulator chambers being connected at their opposite ends with said fresh air intake duct and said outgoing exhaust duct, a second valve means positioned at the connection of said chambers to said fresh air intake duct and said fresh air exhaust duct and at the connection of the opposite ends of said first set of chambers to the opposite ends of the second set of chambers for alternately conducting air flow from said fresh air intake duct into said first set of chambers and said second set of chambers and alternately conducting air flow from said first set of chambers and said second set of chambers into said fresh air exhaust duct with the direction of flow of air in both said fresh air intake and outgoing exhaust ducts being always the same under control of said second valve means, each of said heat accumulator units comprising elements which can be added or subtracted two and two in accordance with the required capacity and/or effectiveness of the apparatus.

2. Apparatus according to claim 1, wherein each heat accumulator chamber comprises an identical number of U-shaped elements, each of which contains one heat accumulator, and means for connecting one element to another element.

* * * * *